(12) United States Patent
Zhou et al.

(10) Patent No.: US 11,467,900 B2
(45) Date of Patent: Oct. 11, 2022

(54) ADJUSTING READ THROUGHPUT LEVEL FOR A DATA RECOVERY OPERATION

(71) Applicant: Micron Technology, Inc., Boise, ID (US)

(72) Inventors: Zhenming Zhou, San Jose, CA (US); Jian Huang, Union City, CA (US); Jiangli Zhu, San Jose, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 21 days.

(21) Appl. No.: 16/928,710

(22) Filed: Jul. 14, 2020

(65) Prior Publication Data

US 2022/0019501 A1   Jan. 20, 2022

(51) Int. Cl.
| G06F 11/00 | (2006.01) |
| G06F 11/10 | (2006.01) |
| G06F 11/14 | (2006.01) |
| G06F 11/07 | (2006.01) |
| G06F 3/06 | (2006.01) |
| G06F 11/30 | (2006.01) |

(52) U.S. Cl.
CPC ........ *G06F 11/1068* (2013.01); *G06F 3/0619* (2013.01); *G06F 3/0659* (2013.01); *G06F 3/0679* (2013.01); *G06F 11/076* (2013.01); *G06F 11/0772* (2013.01); *G06F 11/1471* (2013.01); *G06F 11/3037* (2013.01)

(58) Field of Classification Search
CPC .. G06F 3/0619; G06F 11/1471; G06F 11/076; G06F 3/0659; G06F 11/1068
See application file for complete search history.

(56) References Cited

U.S. PATENT DOCUMENTS

| 6,862,151 | B2* | 3/2005 | Hoskins | G06F 3/0656 |
| 7,177,989 | B1* | 2/2007 | McGinnis | G06F 11/141 |
| | | | | 711/151 |
| 8,140,909 | B2* | 3/2012 | Luan | G11B 5/5526 |
| | | | | 714/42 |
| 9,025,393 | B2* | 5/2015 | Wu | G11C 11/5642 |
| | | | | 365/189.09 |
| 9,627,054 | B2* | 4/2017 | Wu | G11C 13/0064 |
| 10,185,506 | B2* | 1/2019 | Hayes | G06F 3/0647 |
| 2012/0023347 | A1* | 1/2012 | Byom | G06F 3/0679 |
| | | | | 713/320 |

* cited by examiner

*Primary Examiner* — Amine Riad
(74) *Attorney, Agent, or Firm* — Lowenstein Sandler LLP

(57) ABSTRACT

An error associated with a read operation corresponding to a target memory die of a memory sub-system is detected. In response to detecting the error, a first read throughput level of the memory sub-system is identified. The first read throughput level is adjusted to a second read throughput level. A read retry operation associated with the target memory die is executed at the second read throughput level.

20 Claims, 5 Drawing Sheets

ADJUSTING READ THROUGHPUT LEVEL FOR A DATA RECOVERY OPERATION

TECHNICAL FIELD

Embodiments of the disclosure relate generally to memory sub-systems, and more specifically, relate to adjusting a read throughput level for a data recovery operation in a memory sub-system.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
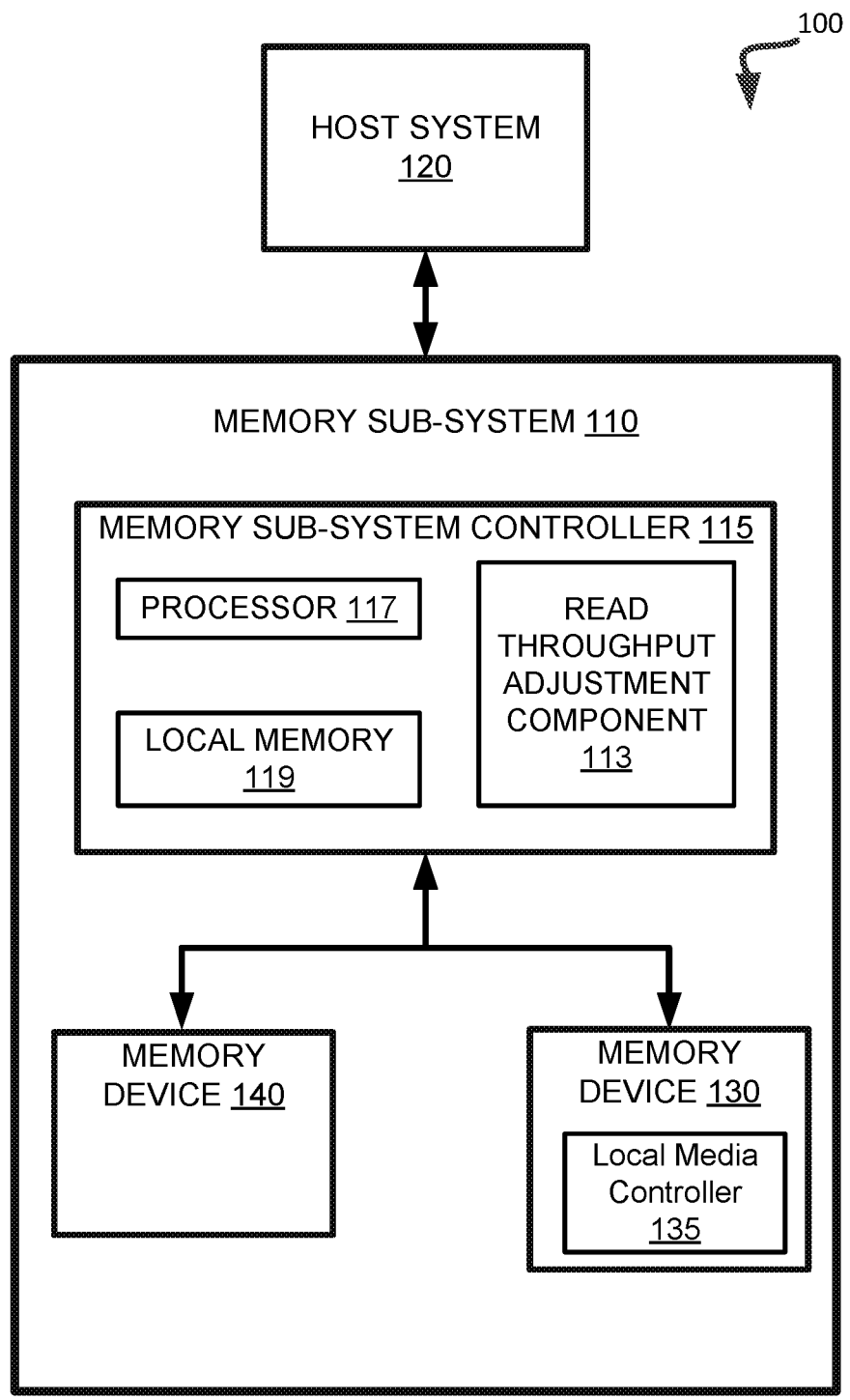
FIG. 1 illustrates an example computing system that includes a memory sub-system in accordance with some embodiments of the present disclosure.

Aspects of the present disclosure are directed to detecting a read error and adjusting a read throughput level in connection with execution of a data recovery operation (e.g., a read retry operation) in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory devices. The host system can provide data to be stored at the memory sub-system and can request data to be retrieved from the memory sub-system.

The memory devices can be non-volatile memory devices, such as three-dimensional cross-point ("3D cross-point") memory devices that are a cross-point array of non-volatile memory that can perform bit storage based on a change of bulk resistance, in conjunction with a stackable cross-gridded data access array. Another example of a non-volatile memory device is a negative-and (NAND) memory device. Other examples of non-volatile memory devices are described below in conjunction with FIG. 1.

Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and has two logic states. The various logic states have corresponding threshold voltage levels. A threshold voltage (VT) is the voltage applied to the cell circuitry (e.g., control gate at which a transistor becomes conductive) to demarcate the state of the cell. A cell is read as one of its logic states based on the VT. For example, in a 3D cross-point system, an SLC with high resistance exhibits a high VT and is read as a logic value or state of "0". Furthermore, an SLC with low resistance exhibits a low VT and is read as a logic value or state of "1".

The VT for the memory cells of 3D cross-point memory devices experience a significant decrease in read voltage levels when a read throughput level is high. The read level decrease can be due to a limit on a power supply level during high read concurrency. The VT of the memory cells of 3D cross-point memory devices shifts up rapidly with time and read disturbs, which results in a higher number of read failures during high throughput conditions. The lower power supply to the memory device caused by the high level of power consumed during high traffic operation can prevent the read level from ramping up to the VT associated with a target memory die, thereby resulting in a read error. In response to the read failures, a read retry operation is needed to read out the data correctly. However, execution of a read retry operation during high read throughput conditions can result in a read retry at an incorrect VT, thus resulting in a read failure or data loss. While conventional 3D cross-point memory devices suffer from VT shifting when read throughput levels are high (e.g., above 5 GB), these conventional 3D cross-point memory devices have no mechanism to manage the significant drop of the VT due to high read level throughputs.

Aspects of the present disclosure address the above and other deficiencies by having a memory sub-system that conducts data recovery operations in response to a read failure or read error (e.g., corrupted data) occurring during high read throughput conditions (when the read throughput level exceeds a threshold throughput level). In an embodiment, a controller of the memory sub-system can detect an error associated with a read operation occurring during a high read throughput state or condition (e.g., wherein the read throughput level exceeds a threshold throughput level). The controller can adjust a read throughput level associated with the read error to establish a decreased or lower read throughput level. Advantageously, the controller executes a read retry operation at the reduced or lower read throughput level to recover the lost data. In an embodiment, the controller can establish a lower read throughput level by limiting a queue depth storing read operation requests from the host system or limiting a number of queues can be used by the host system to process read operation requests.

In an embodiment, the controller can establish the lower read throughput level for execution of the read retry operation by increasing a command-to-command spacing (herein "command spacing") that governs a length of time between respective commands sent by the controller to a memory device. In this embodiment, increasing a current command spacing (e.g., 16 clock cycles) to an adjusted command spacing level (e.g., 32 clock cycles) can reduce the read throughput level for execution of the read retry operation.

Advantages of the present disclosure include, but are not limited to, providing data protection and recovery due to power limitations experienced during high read throughput levels. Another advantage is realized by returning the memory sub-system to the high read throughput level following execution of the read retry operation. In this regard, data loss is prevented by temporarily lowering the read throughput level for purposes of executing the read retry operation, and the memory sub-system is returned to the previous throughput level following recovery of the data. In this regard, data loss is prevented during high speed operation while minimizing the slow down of the throughput by returning to the prior level.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a read throughput adjustment component 113 that can be used to adjust a read throughput level of the memory sub-system 110 in response to a read error associated with a read operation of a targeted memory die of a memory device 130, 140. In some embodiments, the read throughput adjustment component 113 detects a read error corresponding to a read operation executed during a high read throughput state or level. The read throughput adjustment component 113 can determine the current throughput level (e.g., the high read throughput level) corresponding to the read error. In response to the read error, the read throughput adjustment component 113 adjusts the identified read throughput level (e.g., a first read throughput level) to a lower or reduced read throughput level. The read throughput adjustment component 113 executes a read retry operation at the reduced read throughput level to recover the lost data associated with the read error.

In some embodiments, the read throughput adjustment component 113 adjusts the throughput level back to the prior level following execution of the read retry operation and corresponding data recovery. In this embodiment, the adjustment to the read throughput level is limited in duration, enabling the memory sub-system 110 to return to high speed operation (e.g., the first read throughput level) following recovery of the data. In some embodiments, the read throughput adjustment component 113 adjusts the read throughput level by throttling the host system 120. The host system 120 activity can be throttled by limiting or reducing a depth or capacity of one or more queues configure to store new read operation requests sent by the host system 120 for processing by the memory sub-system controller 115. In an embodiment, the host system 120 activity can be throttled by reducing a number of queues that the host system 120 can concurrently utilize (e.g., reduce a number of queues available for the host system 120 to send read operation requests from four queues to two queues), thereby reducing the speed or rate in which the read operations are processed.

In some embodiments, the read throughput adjustment component 113 can lower or reduce the read throughput by increase the command spacing (e.g., a duration or space of time between each command that is sent from the memory sub-system 115 to the memory dies. By increasing the command spacing (e.g., from 16 clock cycles to 32 clock cycles), the speed or level or the processing of operations is reduced, thereby lowering the read throughput level of the memory sub-system 110.

In an embodiment, the read throughput adjustment component 113 executes a read retry operation associated with the target memory die at the adjusted read throughput level to recover the lost data. In an embodiment, following execution of the read retry operation, the read throughput adjustment component 113 can return the memory sub-system 110 to the previous read throughput level or other predetermined read throughput level. In some embodiments, the previous read throughput level (e.g., the level established at the time of the read error) can be set by removing the limit on the queue depth, enabling the previous concurrency of queues, or decreasing the command spacing.

Figure 2:
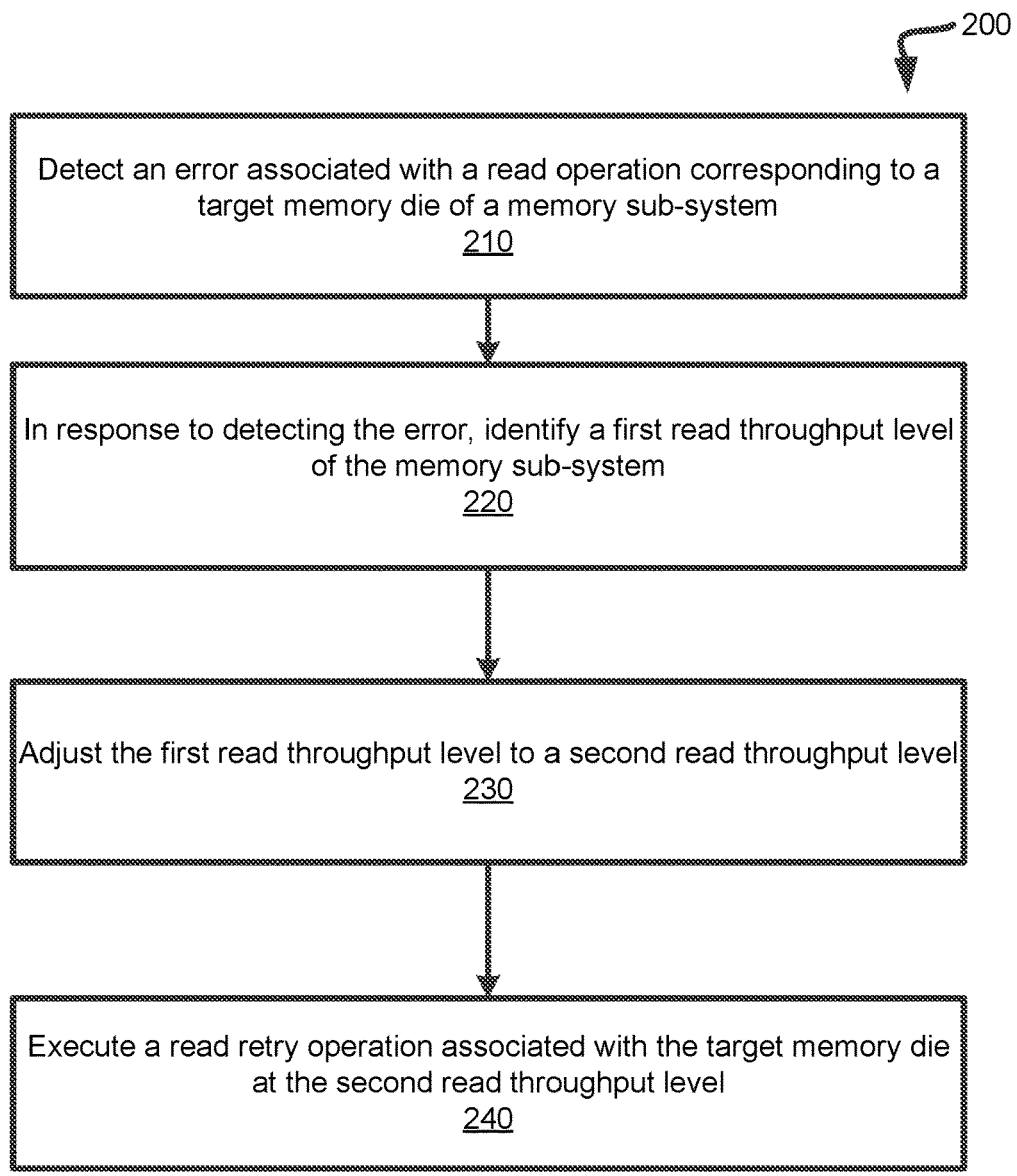
FIG. 2 is a flow diagram of an example method to adjust a read throughput level in response to a read error in accordance with some embodiments.

FIG. 2 is a process flow diagram of an example method 200 to identify a read error, adjust a read throughput level, and perform a data recovery operation (e.g., a read retry operation) at the adjusted read throughput level in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the read throughput adjustment component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 3:
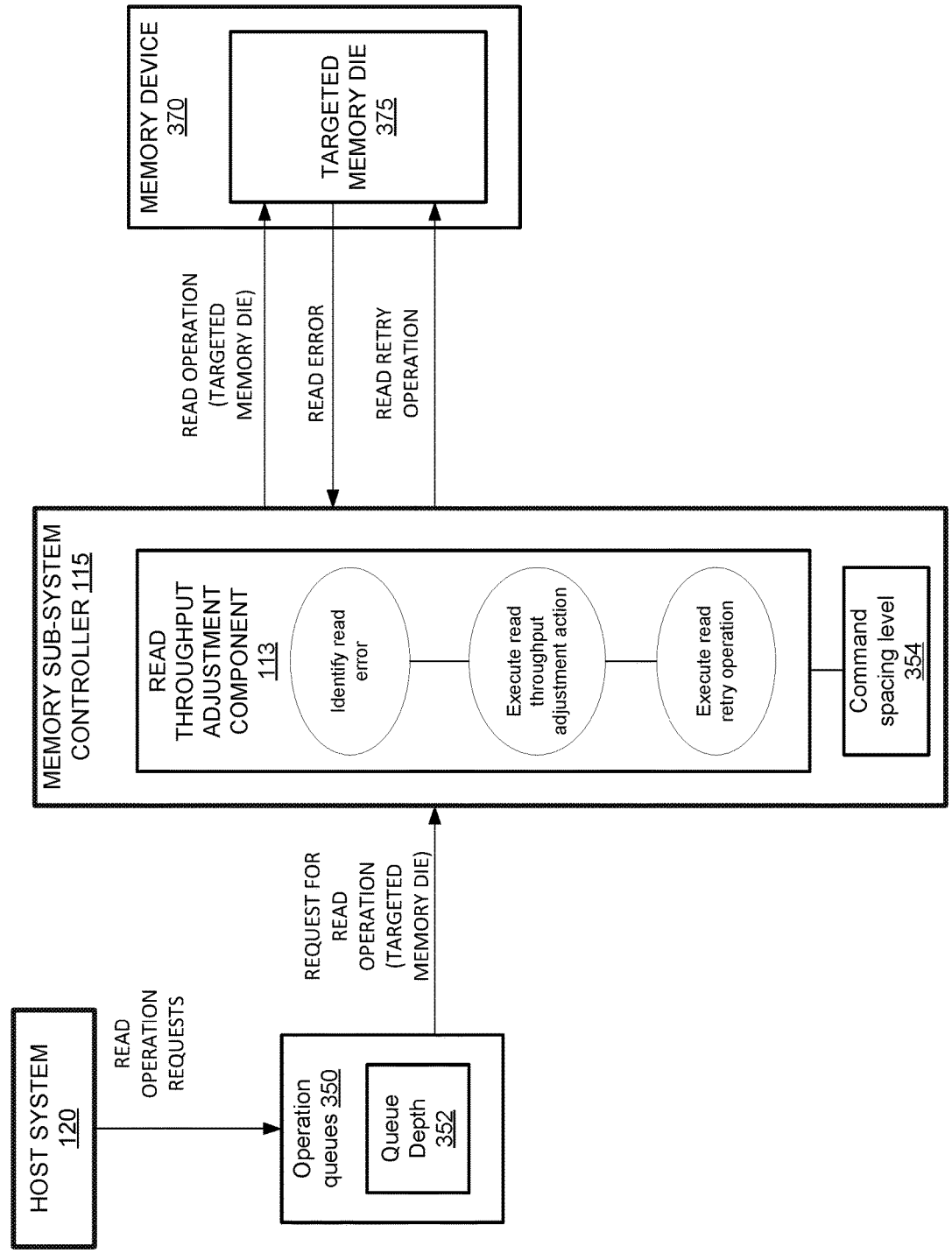
FIG. 3 illustrates an example system including a read throughput adjustment component configured to identify a read error associated with a read operation of a target memory die, execute a read throughput adjustment action, and execute a read retry operation in accordance with some embodiments.

As shown in FIG. 2, at operation 210, the processing logic detects an error associated with a read operation corresponding to a target memory die of a memory sub-system. In an embodiment, the error occurs during the execution of the read operation requested by a host system. In an embodiment, the target memory die is associated with a memory address that is identified in the read operation request generated by the host system. FIG. 3 illustrates an example system including a read throughput adjustment component 113 (e.g., the processing logic) of a memory sub-system controller 115. As shown in FIG. 3, a request from the host system 120 for a read operation associated with the targeted memory die 375 is processed by the memory sub-system controller 115. As shown, a read error associated with the read operation is identified or detected by the read throughput adjustment component 113.

At operation 220, in response to detecting the error, the processing logic identifies a first read throughput level of the memory sub-system. In an embodiment, the first read throughput level is a speed or rate of operations at a time during the execution of the read operation of the target memory die. In an embodiment, the first read throughput level represents a level of traffic (e.g., 5 GB) or speed or rate of the traffic (e.g., 10 GB/s) which consumes a high level of power from a power supply (e.g., a throughput rate or power consumption level that exceeds a threshold level). In an embodiment, the identified first read throughput level can be stored by the processing device. In an embodiment, the first read throughput level represents a high throughput where the memory sub-system runs with the highest throughput settings, such as with no throttling, a full queue capacity, and a minimum command spacing level.

In operation 230, the processing device adjusts the first read throughput level to a second read traffic level. In an embodiment, the processing device lowers the first read throughput level to establish the second read throughput level. According to embodiments of the present disclosure, the processing device sets the second read traffic level by performing one or more read throughput adjustment actions. In an embodiment, the adjustment action can include reducing a limit of a queue depth of one or more queues storing read operation requests generated by the host system. In this embodiment, by reducing or limiting a number of requests that can be provided to and stored in the one or more queues, the read throughput level is reduced.

As shown in FIG. 3, the host system 120 sends one or operation requests to be stored in one or more operation queues 350, each queue having a corresponding queue depth 352 (e.g., a quantity or number of operations the queue can receive from the host system 120 and store for processing by the memory sub-system controller 115. In an embodiment, the read throughput adjustment component 113 of FIG. 3 can establish the second read throughput level by reducing or limit a size or capacity of the one or more queue depths 352.

In an embodiment, multiple operation queues 350 can be accessible to the host system 120 for receiving and processing read operation requests. For example, multiple different queues 350 can receive read operation requests in parallel. Accordingly, the more queues 350 available to the host system 120, the higher the potential throughput due to the concurrent processing by the multiple queues 350. In an embodiment, in operation 230, the read throughput adjustment component 113 of FIG. 3 can limit or reduce a number of queues 352 available to the host system 120 (e.g., reduce the operation concurrency).

In an embodiment, the processing device adjusts the first read throughput level to a second read traffic level by increasing a command spacing parameter which indicates a rate at which commands are sent from the memory sub-system controller 115 to the memory device 370. With reference to FIG. 3, the read throughput adjustment component 113 controls the command spacing setting level 354 to change a duration of time (e.g., a number of clock cycles) in between the commands sent to the memory device 370.

Figure 4:
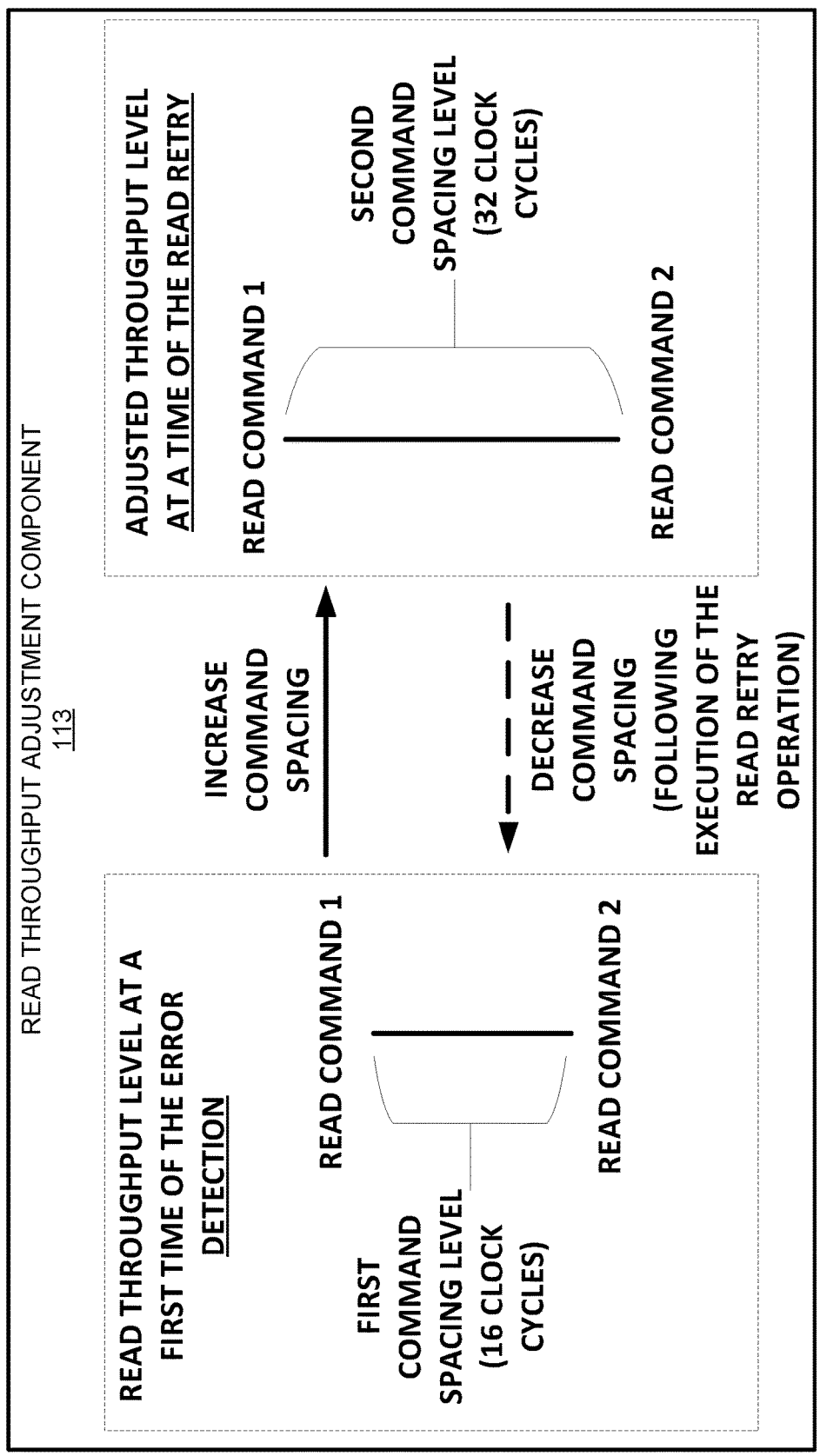
FIG. 4 illustrates an example read throughput adjustment component adjusting a read throughput level by increasing a command spacing level in accordance with some embodiments.

FIG. 4 illustrates an example read throughput adjustment component 113 of the present disclosure. As shown, the read throughput adjustment component 113 determines the read throughput level at a first time corresponding to the detection of a read error. The read throughput adjustment component 113 identifies a current setting or value for the command spacing which defines a duration of time (e.g., a number of clock cycles) between respective commands (e.g., read operation commands) sent by a controller to a memory device. In the example shown, a first command spacing level (e.g., number of clock cycles between Read Command 1 and Read Command 2 is set to 16 clock cycles. In operation 230 of FIG. 2, the read throughput adjustment component 113 can increase the first command spacing level to establish a second command spacing level to adjust the first read throughput level to the second read throughput level. In the example of FIG. 4, the read throughput adjustment component 113 sets a second command spacing level to 32 clock cycles, thereby slowing or decreasing the read throughput level.

With reference to FIG. 2, in operation 240, the processing logic executes a data recovery operation associated with the target memory die at the second read throughput level. In an embodiment, the data recovery operation is a read retry operation directed to the address associated with the targeted memory die to recover the data lost due to the detected read error. Advantageously, the data recovery operation is performed at the reduced read throughput level due to the read throughput adjustment action (e.g., throttling the host system traffic by limiting or reducing the queue depth of one or more queues storing operation requests from the host system, throttling the host system traffic by reducing a number of queues accessible to the host system (e.g., queue concurrency), or reducing the command-to-command spacing level (e.g., as shown in FIG. 4). The reduction in the read throughput level results in an increase of the power levels to enable the read retry operation to successfully recover the lost data.

In an embodiment, following completion of the read retry operation, the processing logic can return the read throughput level to its prior level (e.g., re-establish the first read throughput level, as shown in FIG. 4. In an embodiment, the return to the previous read throughput level can be achieved by the processing logic reversing the prior read throughput adjustment action (e.g., removing the limit on the queue depth, enabling concurrency in multiple queues accessible by the host system, or decreasing the command spacing. In this regard, the memory sub-system can return to a normal or previous speed and command spacing following completion of the read retry operation. In an embodiment, the read throughput level (e.g., the read traffic speed) can be decreased for a short period of time to enable the recovery of the lost data, then returned to the prior high speed operation.

Figure 5:
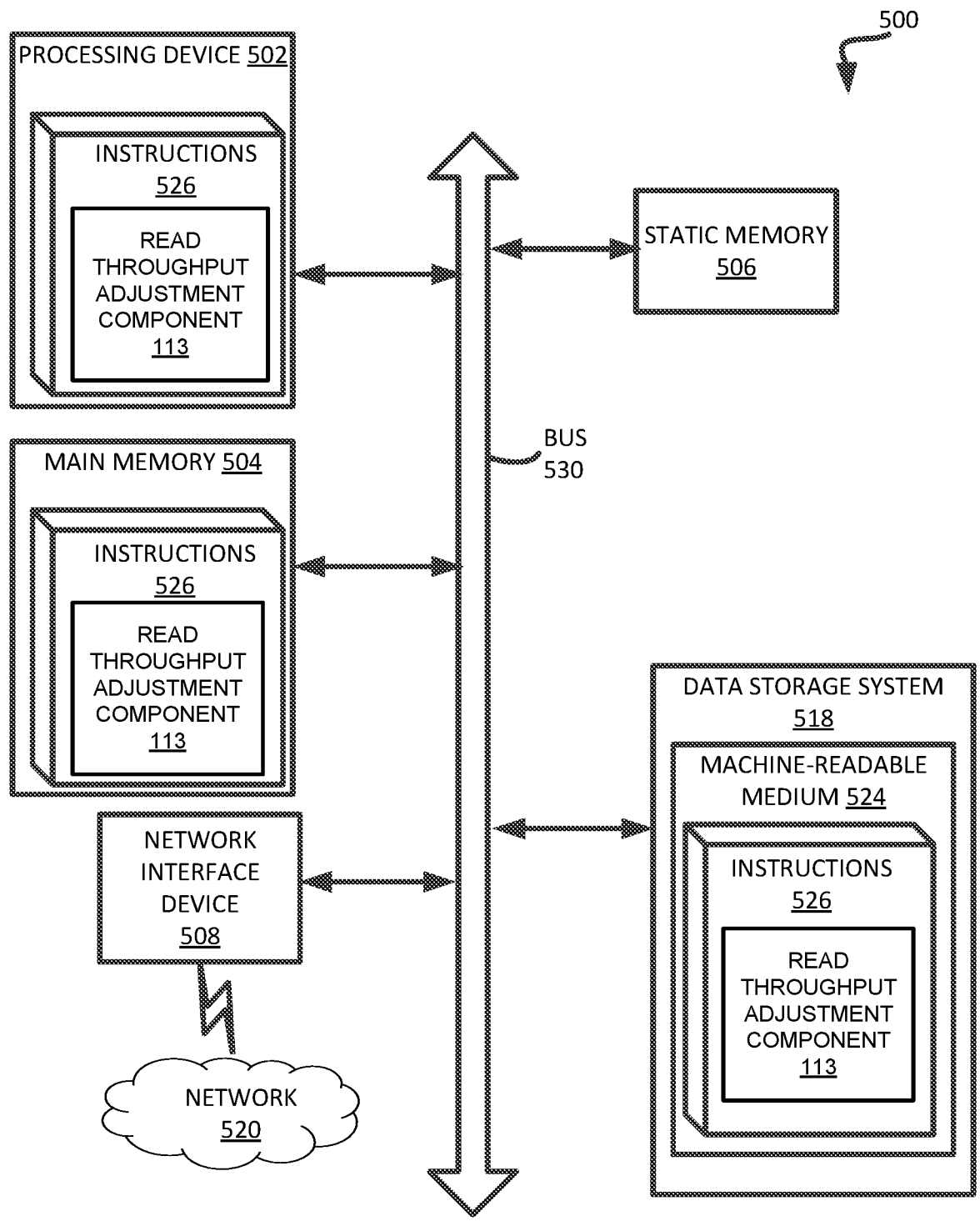
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a read throughput adjustment component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a refresh operation component (e.g., the read throughput adjustment component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    detecting, by a processing device, an error associated with a read operation corresponding to a target memory die of a memory sub-system;
    in response to detecting the error, identifying a first read throughput level of the memory sub-system;
    decreasing a depth of one or more queues receiving operation requests from a host system to adjust the first read throughput level to a second read throughput level; and
    executing a read retry operation associated with the target memory die at the second read throughput level.

2. The method of claim 1, wherein the depth of the one or more queues corresponds to a storage capacity associated with the operation requests.

3. The method of claim 1, wherein adjusting the first read throughput level to the second read throughput level further comprises decreasing a quantity of queues receiving operation requests from the host system.

4. The method of claim 1, wherein adjusting the first read throughput level to the second read throughput level further comprises increasing a level of spacing between commands sent to one or more memory dies of the memory sub-system.

5. The method of claim 1, further comprising adjusting the second read throughput level to the first read throughput level following completion of the read retry operation.

6. The method of claim 1, wherein the first read throughput level is greater than a threshold throughput level.

7. The method of claim 1, wherein execution of the read retry operation recovers data loss due to the error associated with the read operation corresponding to the target memory die.

8. A non-transitory computer readable medium comprising instructions, which when executed by a processing device, cause the processing device to perform operations comprising:
    identifying a read error associated with a read operation of a target memory die of a memory sub-system;
    executing an action comprising decreasing a depth of one or more queues receiving operation requests from a host system to decrease a read throughput level of the memory sub-system; and
    executing a data recovery operation to recover data lost due to the read error.

9. The non-transitory computer readable medium of claim 8, wherein the data recovery operation comprises a read retry operation.

10. The non-transitory computer readable medium of claim 8, wherein the action further comprises decreasing a quantity of queues receiving operation requests from a host system.

11. The non-transitory computer readable medium of claim 10, wherein the action further comprises increasing a number of clock cycles between commands sent to one or more memory dies of the memory sub-system.

12. The non-transitory computer readable medium of claim 8, the operations further comprising establishing an increased read throughput level of the memory sub-system following execution of the data recovery operation.

13. The non-transitory computer readable medium of claim 8, wherein a read throughput level during the read operation of the memory die exceeds a threshold throughput level.

14. A system comprising:
    a memory die; and
    a processing device, operatively coupled with the memory die, to:
        detect an error associated with a read operation corresponding to the memory die of a memory sub-system;
        in response to the error, identify a first read throughput level of the memory sub-system;
        decrease a depth of one or more queues receiving operation requests from a host system to adjust the first read throughput level to a second read throughput level; and
        execute a read retry operation associated with the memory die at the second read throughput level.

15. The system of claim 14, wherein the depth of the one or more queues corresponds to a storage capacity associated with the operation requests.

16. The system of claim 14, wherein adjusting the first read throughput level to the second read throughput level further comprises decreasing a quantity of queues receiving operation requests from a host system.

17. The system of claim 14, wherein adjusting the first read throughput level to a second read throughput level further comprises increasing a level of spacing between commands sent to one or more memory dies of the memory sub-system.

18. The system of claim 14, wherein the processing device is further to adjust the second read throughput level to the first read throughput level following completion of the read retry operation.

19. The system of claim 14, wherein the first read throughput level is greater than a threshold throughput level.

20. The system of claim 14, wherein execution of the read retry operation recovers data loss due to the error associated with the read operation corresponding to the memory die.

* * * * *